US012493806B2

(12) United States Patent
Kapoor et al.

(10) Patent No.: US 12,493,806 B2
(45) Date of Patent: Dec. 9, 2025

(54) ARTIFICIAL INTELLIGENCE ENABLED DATA PRIVACY FOR VIRTUAL ASSISTANTS

(71) Applicant: INTERNATIONAL BUSINESS MACHINES CORPORATION, Armonk, NY (US)

(72) Inventors: Sumeet Surendra Kapoor, Pune (IN); Snehal U Pansare, Pune (IN); Girish Padmanabhan, Pune (IN)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 17/662,084

(22) Filed: May 5, 2022

(65) Prior Publication Data

US 2023/0359911 A1    Nov. 9, 2023

(51) Int. Cl.
*G06N 5/043* (2023.01)
*G06F 40/30* (2020.01)

(52) U.S. Cl.
CPC ............. *G06N 5/043* (2013.01); *G06F 40/30* (2020.01)

(58) Field of Classification Search
CPC ................................ G06N 5/043; G06F 40/30
See application file for complete search history.

(56) References Cited

U.S. PATENT DOCUMENTS

| 11,017,115 | B1 | 5/2021 | Young | |
| 12,032,642 | B1 * | 7/2024 | Guerra | G06F 16/9538 |
| 2014/0207442 | A1 | 7/2014 | Ganong, III | |
| 2016/0262017 | A1 | 9/2016 | Lavee | |
| 2016/0357970 | A1 | 12/2016 | Dow | |
| 2020/0134211 | A1 | 4/2020 | Miller | |
| 2025/0028770 | A1 * | 1/2025 | Carbune | G06F 3/167 |

OTHER PUBLICATIONS

Disclosed Anonymously, "AI Infused Privacy Controls in a Smart Speaker or Virtual Assistant," ip.com, IP.com No. IPCOM000262320D, IP.com Publication Date: May 19, 2020, 5 pages.
Lalitha et al., "ML Based Virtual Personal Assistant," IFERP, ISSN (Online) 2394-2320, International Journal of Engineering Research in Computer Science and Engineering (IJERCSE), vol. 6, Issue 7, Jul. 2019, pp. 158-161.

(Continued)

*Primary Examiner* — Eric Yen
(74) *Attorney, Agent, or Firm* — Anthony M. Pallone

(57) ABSTRACT

According to one embodiment, a method, computer system, and computer program product for evaluating a data request is provided. The embodiment may include receiving a request to share data of a user during an interaction between an intelligent virtual assistant (IVA) representing the user and a requesting entity. The request is sent from the requesting entity to the IVA. The embodiment may include calculating an overall data sharing confidence score based on an evaluation of the request. The embodiment may include determining whether the overall data sharing confidence score is above a data sharing threshold value. In response to determining that the overall data sharing confidence score is above the data sharing threshold value, the embodiment may include instructing the IVA to share the data of the user with the requesting entity.

20 Claims, 5 Drawing Sheets

(56) References Cited

OTHER PUBLICATIONS

Mell et al., "The NIST Definition of Cloud Computing", National Institute of Standards and Technology, Special Publication 800-145, Sep. 2011, 7 pages.

Wolfson, "Blockchain-Based AI Voice Assistant Brings Data Privacy to Smart Homes," Forbes, Sep. 14, 2018, https://www.forbes.com/sites/rachelwolfson/2018/09/14/blockchain-based-ai-voice-assistant-brings-data-privacy-to-smart-homes/?sh=41db56996b50, 5 pages.

* cited by examiner

ARTIFICIAL INTELLIGENCE ENABLED DATA PRIVACY FOR VIRTUAL ASSISTANTS

BACKGROUND

The present invention relates generally to the field of computing, and more particularly to virtual assistants.

An intelligent virtual assistant (IVA) or intelligent personal assistant is a software agent that may perform tasks or services for an individual or corporation based on received commands or questions. Common methods of user interaction with a virtual assistant include, but are not limited to, text (e.g., online chat), short message service (SMS) text, e-mail or other text-based communication channel, and voice. Many virtual assistants utilize natural language processing (NLP) to match user text or voice input to executable commands and respond via synthesized voices. Additionally, virtual assistants may continually learn using artificial intelligence techniques such as machine learning. Using an IVA, a user may, for example, submit spoken queries for information (e.g., weather, facts), control home automation devices and media playback via voice, and manage other basic tasks such as email, alarms, to-do lists, and calendars with verbal commands. IVAs may also be used to complement and/or replace customer service functions by humans. Use of IVAs is becoming increasingly widespread as virtual assistants may be integrated into or across many types of platforms such as Internet-of-things (IoT) devices, instant messaging and mobile applications, websites, mobile and desktop operating systems, smartphones, appliances, cars, and wearable technology.

SUMMARY

According to one embodiment, a method, computer system, and computer program product for evaluating a data request is provided. The embodiment may include receiving a request to share data of a user during an interaction between an intelligent virtual assistant (IVA) representing the user and a requesting entity. The request is sent from the requesting entity to the IVA. The embodiment may include calculating an overall data sharing confidence score based on an evaluation of the request. The embodiment may include determining whether the overall data sharing confidence score is above a data sharing threshold value. In response to determining that the overall data sharing confidence score is above the data sharing threshold value, the embodiment may include instructing the IVA to share the data of the user with the requesting entity.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
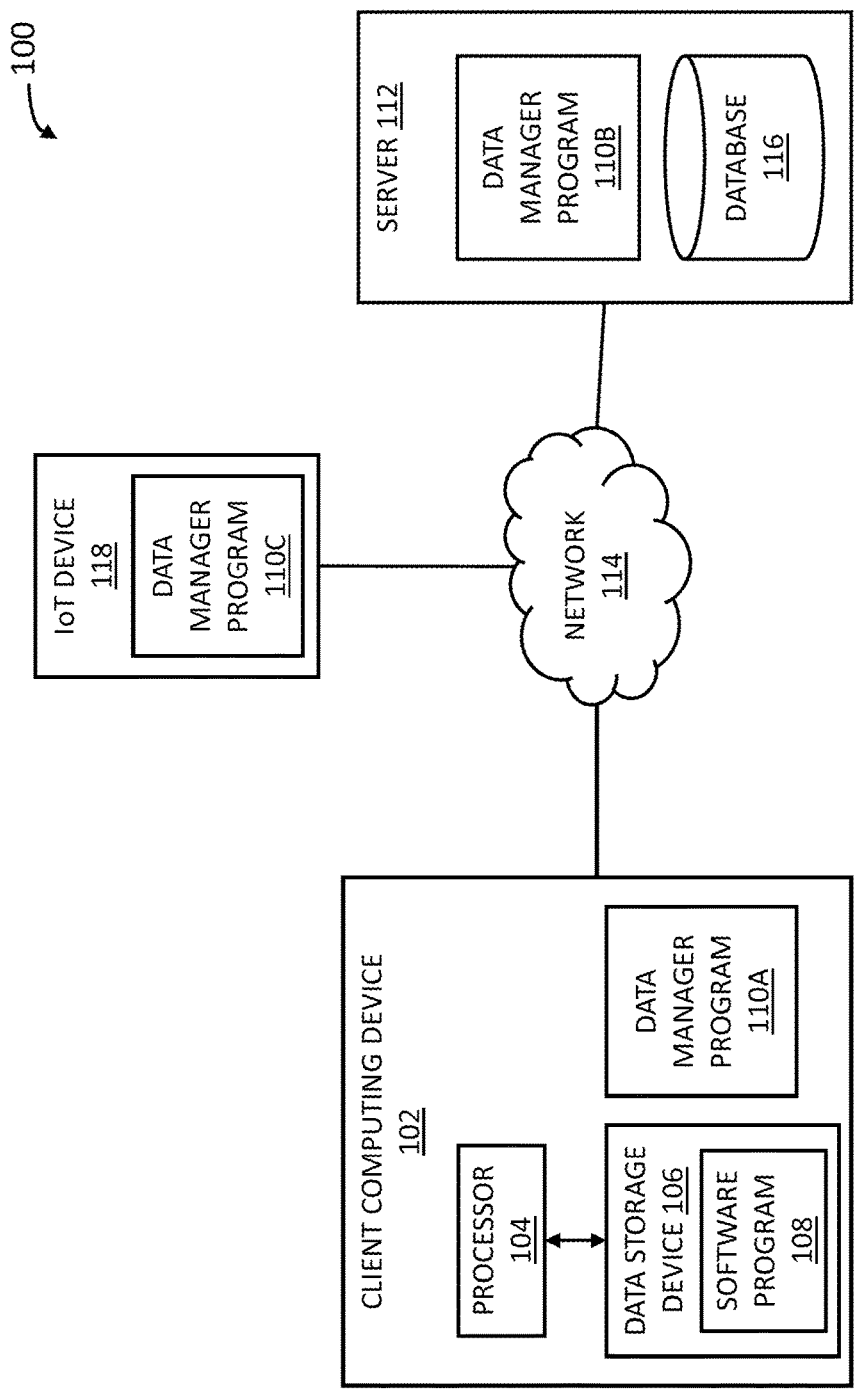
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to virtual assistants and data privacy. The following described exemplary embodiments provide a system, method, and program product to, among other things, identify whether or not data of a user can be shared with a requesting entity based on an evaluation of several factors associated with the data request and, accordingly, share or withhold the requested data with or from the requesting entity. Therefore, the present embodiment has the capacity to improve the technical field of virtual assistants by dynamically identifying when data of a user should not be shared by a virtual assistant of the user, thus enabling a multi-level access control governance for confidential and sensitive information of a user and promoting increased data privacy.

As previously described, an IVA is a software agent that may perform tasks or services on behalf of an individual or corporation based on received commands or questions. Common methods of user interaction with a virtual assistant include, but are not limited to, text (e.g., online chat), SMS text, e-mail or other text-based communication channel, and voice. Many virtual assistants utilize NLP to match user text or voice input to executable commands and respond via synthesized voices. Additionally, virtual assistants may continually learn using artificial intelligence techniques such as machine learning. Using an IVA, a user may, for example, submit spoken queries for information (e.g., weather, facts), control home automation devices and media playback via voice, and manage other basic tasks such as email, alarms, to-do lists, and calendars with verbal commands. IVAs may also be used to complement and/or replace customer service functions by humans. Use of IVAs is becoming increasingly widespread as virtual assistants may be integrated into or across many types of platforms such as IoT devices, instant messaging and mobile applications, websites, mobile and desktop operating systems, smartphones, appliances, cars, and wearable technology.

In addition to platform integration diversity, advances in artificial intelligence (AI) and NLP are also fostering widespread usage of IVAs for commercial and personal purposes. For example, IVAs such as chatbots and smart speakers are used for various applications across several end-user industries including banking, financial services and insurance (BFSI) and healthcare. Also, as mentioned above, use of IVAs are becoming increasingly common for performance of routine tasks on behalf of an enterprise or a personal user (e.g., customer support, responding to queries in a chat, controlling smart home devices, making dinner reservations or other appointments). However, such widespread usage of IVAs may present data privacy issues as these IVAs may have wide-ranging access to user data including, but not limited to, emails, messages, chats, document repositories, confidential information, and financial information. With such wide-ranging data access, it is possible that an IVA acting on behalf of a user may release data which the user would otherwise withhold in response to a query. It may therefore be imperative to have a system in place for an IVA to validate requests to share any confidential and sensitive data of a user and respond accordingly. Thus, embodiments of the present invention may be advantageous to, among other things, identifying a context associated with a request to share confidential or sensitive information of a user, applying privacy and/or access control rules based on an identified context, and controlling what data may be shared by an IVA when interacting with another entity. The present invention does not require that all advantages need to be incorporated into every embodiment of the invention.

According to at least one embodiment, an IVA may be used to represent a user and respond to inquiries on behalf of the user. In response to a request originating from an external entity for data/information of the user made during an interaction between the IVA and the external entity, the IVA may access a data manager module to determine if the requested data/information can be shared with the requesting entity based on a context of the interaction and other factors. According to at least one embodiment, the other factors may include predefined templates defining data sharing rules, a trust factor of the requesting entity, authentication of the user and requesting entity, data privacy policies that may be in place, and consent from the user (i.e., the owner of the information). If output from the data manager exceeds a threshold value, the IVA may share the requested data/information of the user with the requesting entity.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to dynamically control what data of a user may be shared by an IVA when interacting with another entity on behalf of the user.

Referring to FIG. 1, an exemplary networked computer environment 100 is depicted, according to at least one embodiment. The networked computer environment 100 may include a client computing device 102, a server 112, and an IoT device 118 interconnected via a communication network 114. According to at least one implementation, the networked computer environment 100 may include a plurality of client computing devices 102, servers 112, and IoT devices 118, of which only one is shown for illustrative brevity. Additionally, in one or more embodiments, the client computing device 102, the sever 112, and the IoT device 118 may each host a data manager (DM) program 110A, 110B, 110C, respectively. In one or more other embodiments, the DM program 110A, 110B, 110C may be partially hosted on client computing device 102, the server 112, and the IoT device 118 so that functionality may be separated among the devices.

The communication network 114 may include various types of communication networks, such as a wide area network (WAN), local area network (LAN), a telecommunication network, a wireless network, a wireless ad hoc network (i.e., a wireless mesh network), a public switched network and/or a satellite network. The communication network 114 may include connections, such as wired or wireless communication links or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a DM program 110A and communicate with the server 112 and the IoT device 118 via the communication network 114, in accordance with embodiments of the invention. In at least one embodiment of the invention, the software program 108 may be any known IVA program capable of performing routine tasks and responding to inquiries from an external entity (e.g., requests for information) on behalf of a user of the client device 102. Moreover, in embodiments of the invention, client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a DM program 110B and a database 116 and communicating with the client computing device 102 and the IoT device 118 via the communication network 114, in accordance with embodiments of the invention. As will be discussed with reference to FIG. 3, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT device 118 may be any known IoT-enabled computing device (e.g., a smart speaker, a smartphone, a smartwatch, a smart tv, a smart appliance, an automobile,) having a processor, a memory, and network capability and capable of hosting and running one or more software programs such as an IVA and DM program 110C. In embodiments of the invention, the IoT device 118 may be further capable of communicating with the client computing device 102 and the server 112 via the communication network 114. As will be discussed with reference to FIG. 3, the IoT device 118 may include internal components 402c and external components 404c, respectively.

According to the present embodiment, the DM program 110A, 110B, 110C may be a program capable of accessing data of a user, implementing a multi-component access control governance for data of a user, monitoring communications between an IVA, acting on behalf of a user, and another entity (e.g., a person or another IVA), validating requests to share information of a user made by a requesting entity, controlling what data items of a user may be shared by an IVA of the user when interacting with another entity, and updating components of a multi-component access control governance for data sharing based on learned interactions. In embodiments of the invention, the DM program 110A, 110B, 110C may include the following components working in coordination with each other: a template manager, a consent manager, a trust manager, a policy manager, and an identity manager. According to at least one embodiment, the DM program 110A, 110B, 110C may require each user to opt-in to system usage and allow for data access upon opening or installation of the DM program 110A, 110B, 110C. In at least one embodiment, the DM program 110A, 110B, 110C may be implemented as an IVA which may monitor and govern interactions between another IVA (e.g., software program 108), operating on behalf of a user, and a third party. In at least one other embodiment, the DM program 110A, 110B, 110C may be implemented as a software module incorporated within or accessible by another software application (e.g., as a plug-in to an IVA, or accessible by an IVA, such as software program 108). The DM method is explained in further detail below with respect to FIG. 2.

Figure 2:
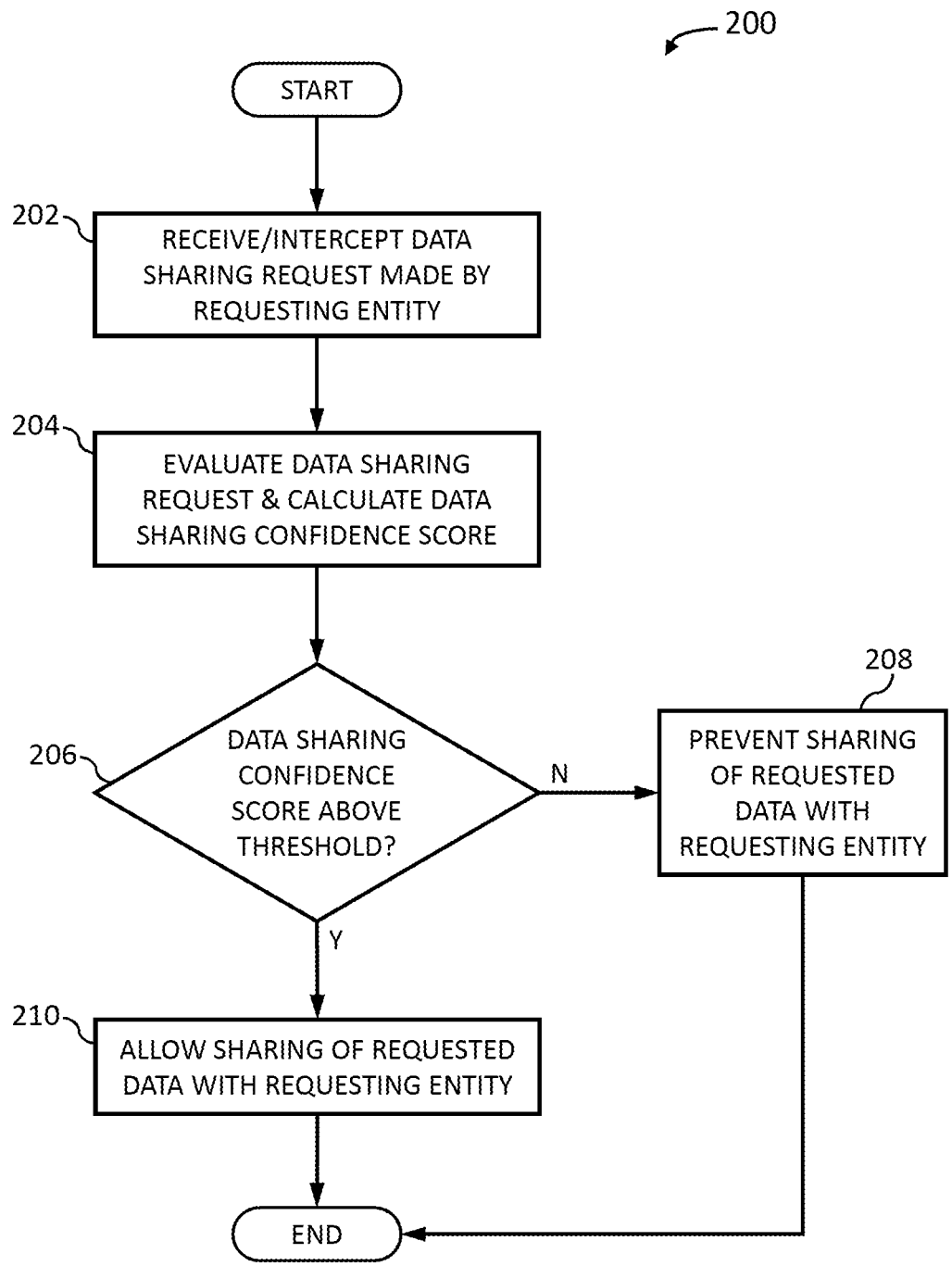
FIG. 2 illustrates an operational flowchart for evaluating a request for data of a user in a data sharing process according to at least one embodiment.

Referring now to FIG. 2, an operational flowchart for validating a request for data of a user in a data sharing process 200 is depicted according to at least one embodiment. At 202, the DM program 110A, 110B, 110C receives or intercepts a request to share data of a user made by a requesting entity during an interaction between an IVA, operating on behalf of the user, and the requesting entity. The IVA operating on behalf of the user may be a software program within a computing device of the user (e.g., software program 108 within computing device 102) or may be integrated within an IoT device of the user (e.g., IoT device 118), and may have widespread access to data of the user, including sensitive and confidential information as well as any document repositories of the user. Moreover, the requesting entity may be another IVA, a software application, or a person, and the interaction may include a conversation via text (e.g., text chat) or via voice (e.g., a call). The requested data may include sensitive or confidential information of the user. Upon the user opting into DM program 110A, 110B, 110C usage, the DM program 110A, 110B, 110C may communicate with the IVA operating on behalf of the user and may also acquire access to the data of the user. It should be noted that in some embodiments, a user may include an organization and the requested data may include sensitive or confidential information of the organization. In an example embodiment, the data of the user may be stored within data storage device 106 or database 116 and accessed by the IVA operating on behalf of the user (e.g., software program 108) and the DM program 110A, 110B, 110C via network 114.

Next, at 204, the DM program 110A, 110B, 110C evaluates the data sharing request made by the requesting entity received or intercepted at 202. As part of the evaluation, the DM program 110A, 110B, 110C may apply known NLP and sentiment analysis techniques to text of the interaction between the IVA and the requesting entity in order to identify a context of the interaction and the data sharing request. In situations where the interaction between the IVA and the requesting entity is performed via voice, the DM program 110A, 110B, 110C may apply speech-to-text processing to captured audio of the interaction prior to implementation of NLP and sentiment analysis. The context of the interaction and the data sharing request may initially include information such as identification of the IVA, identification or group affiliation of the requesting entity, interaction setting (e.g., workplace/commercial setting, personal/home setting), the type or category of user data requested, interaction topic, storage location(s) of the requested user data, and any data privacy policies which may be applicable. As mentioned above, the DM program 110A, 110B, 110C may include a template manager component, a consent manager component, a trust manager component, a policy manager component, and an identity manager component; these components may communicate and work in coordination with each other as part of the evaluation of the data sharing request.

Continuing with 204, the DM program 110A, 110B, 110C may invoke the template manager component to assess the data sharing request of 202 against one or more predefined templates. The one or more predefined templates may include domain specific knowledge relating to defined contexts of interaction and data sharing requests, defined categories or types of data (e.g., financial, medical, personal, organizational) with corresponding sensitivity values, defined communication types, defined data owners, known requesting entities, defined groups of people (e.g., organizational groups or hierarchies, family groups, friend groups), defined applications, defined trust levels for known requesting entities and defined groups of people and applications, and defined data sharing rules which map defined categories of data and defined data owners with known requesting entities and defined groups of people or applications with which a data owner may share data of a category. In assessing the data sharing request against the one or more predefined templates, the template manager component, at the direction of the DM program 110A, 110B, 110C, may calculate a confidence score based on a degree to which the data sharing request matches one or more of the predefined templates. The template manager component may coordinate with the other components of the DM program 110A, 110B, 110C in furtherance of the evaluation of the data sharing request.

According to at least one embodiment, aspects of the one or more predefined templates may be defined by a user, during an initialization/set-up of the DM program 110A, 110B, 110C, based on domain specific knowledge and preferences of the user. Additionally, during the initialization/set-up of the DM program 110A, 110B, 110C, the user may define a threshold value above which sharing of user data may be allowed, and below which sharing of user data may be prevented. According to at least one further embodiment, the DM program 110A, 110B, 110C may manage templates of the template manager component based on historical/learned knowledge from interactions between an IVA, operating on behalf of the user, and a data requesting entity. Management of templates of the template manager component may include, for example, updates (e.g., deletions, additions) to defined groups of people or applications, addition of newly defined groups of people or applications, updates to defined data sharing rules, addition of newly defined data sharing rules, as well as updates to any other aspects of the templates. Moreover, according to at least one further embodiment, the DM program 110A, 110B, 110C may, via the template manager component, create templates using machine learning and NLP techniques based on historical contextual data from previous interactions between a user and a data requesting entity.

With continued reference to 204, the DM program 110A, 110B, 110C may additionally invoke the consent manager component to further assess the data sharing request in situations where the data sharing request is a new request that cannot be evaluated by one or more of the other components of the DM program 110A, 110B, 110C. For example, a data sharing request may be considered new when it includes a request for a type or category of data which the IVA has not seen before, when it is from a requesting entity that has not requested data in the past (i.e., a new requesting entity), when templates of the template manager component do not have entries for the type or category of data requested, or for the requesting entity, or when a trust level, as discussed below, cannot be defined by the trust manager component. In situations where the data sharing request is considered a new request, the consent manager component, at the direction of the DM program 110A, 110B, 110C, may request consent from the user whom the IVA is representing. For instance, if the IVA is requested to share a contact or one-time password/passcode (OTP) of the user with a requesting entity which is within a family group, the DM program 110A, 110B, 110C may not invoke the consent manager component and thus not request consent from the user whom the IVA is representing. However, if the requesting entity is outside of the family group or is a new requesting entity, the DM program 110A, 110B, 110C may invoke the consent manager component and consequently request consent from the user whom the IVA is representing. The consent manager component, at the direction of the DM program 110A, 110B, 110C, may calculate a confidence score based on the response (e.g., approval or denial) of the user when consent is requested. The consent manager component may coordinate with the other components of the DM program 110A, 110B, 110C in furtherance of the evaluation of the data sharing request. For example, the consent manager component may update the template manager component based on the response of the user when consent is requested.

According to at least one embodiment, the DM program 110A, 110B, 110C may also invoke the consent manager component to request consent from the user whom the IVA is representing in situations where a conflict exits concerning the sharing of data of a particular type or category. For example, if organizational data sharing guidelines or regional data privacy policies are in effect, the DM program 110A, 110B, 110C may invoke the consent manager component and request a consent response from the user whom the IVA is representing.

With continued reference to 204, the DM program 110A, 110B, 110C may additionally invoke the trust manager component to further assess the data sharing request of 202 by evaluating a trust level for the interaction between the IVA, operating on behalf of the user, and the requesting entity. In evaluating the trust level for the interaction, the trust manager component may coordinate with the template manager component to identify if the requesting entity is a known entity with a defined trust level or within a defined group of people or applications with a defined trust level, and to identify if the requesting entity is subject to any defined data sharing rules. Moreover, the trust manager component may be responsible for maintaining any defined trust levels within the predefined templates and thus may coordinate with the template manager component for template updates. For example, the trust manager component may use sentiment analysis and NLP techniques to learn from interactions of the user with different entities and update trust levels accordingly. In the case of a new data sharing request, the DM program 110A, 110B, 110C may, via the trust manager component, define a trust level for a requesting entity based on learned historical knowledge from interactions of the user whom the IVA is representing, and coordinate with the template manager component to update trust levels accordingly. The trust manager component, at the direction of the DM program 110A, 110B, 110C, may calculate a confidence score based on the evaluated trust level for the interaction between the IVA, operating on behalf of the user, and the requesting entity. The trust manager component may coordinate with the other components of the DM program 110A, 110B, 110C in furtherance of the evaluation of the data sharing request.

Continuing with 204, the DM program 110A, 110B, 110C may additionally invoke the policy manager component to further assess the data sharing request by ensuring that the IVA is in alignment with any organizational data sharing guidelines or regional data privacy policies which may be in effect for the user whom the IVA is representing. The policy manager component may be responsible for processing (i.e., analyzing utilizing NLP) these policies and applying them when determined to be relevant to an interaction between an IVA, operating on behalf of the user, and a requesting entity. The policy manager component may utilize NLP techniques to identify a context of the interaction and the data sharing request when determining relevance of any organizational data sharing guidelines or regional data privacy policies which are in effect. The policy manager component, at the direction of the DM program 110A, 110B, 110C, may calculate a confidence score based on the application of any organizational data sharing guidelines or regional data privacy policies to the interaction between the IVA and the requesting entity. For example, a low confidence score may result where such a policy is applied to an interaction between an IVA, operating on behalf of the user, and a requesting entity. The policy manager component may coordinate with the other components of the DM program 110A, 110B, 110C in furtherance of the evaluation of the data sharing request. According to at least one embodiment, the policy manager component may be initialized with organizational data sharing guidelines or regional data privacy policies which may be in effect for the user during an initialization/set-up of the DM program 110A, 110B, 110C.

With continued reference to 204, the DM program 110A, 110B, 110C may additionally invoke the identity manager component to further assess the data sharing request by authenticating the identity of the requesting entity and the user, whom the IVA is representing, when sensitive or confidential information (e.g., an OTP, passport information) of the user is requested. For example, when such information is requested, the identity manager component may send an authentication code to each party (i.e., the requesting entity and the user) and request a confirmation from each one. Failure to authenticate either party may indicate an invalid data request or potential impersonation of a party. Moreover, based on authentication outcomes (i.e., successful confirmation of both parties or failure of either party), the identity manager component may coordinate with other components of the DM program 110A, 110B, 110C, such as the template manager and trust manager components, to update trust levels therein accordingly. The identity manager component, at the direction of the DM program 110A, 110B, 110C, may calculate a confidence score based on authentication outcomes. For example, a low confidence score may result where authentication of either party has failed, whereas a high confidence score may result where authentication of both parties is successful.

According to at least one embodiment, the template manager component, the consent manager component, the trust manager component, the policy manager component, and the identity manager component of the DM program 110A, 110B, 110C may communicate among each other and accept inputs from each other when calculating their respective confidence scores. For example, the trust manager component may accept inputs from the template manager component, the identity manager component, and the policy manager component when updating a trust level for a requesting entity not seen before and calculating a confidence score.

Furthermore, at 204, the DM program 110A, 110B, 110C calculates an overall data sharing confidence score based on confidence scores calculated by the template manager component, the consent manager component, the trust manager component, the policy manager component, and the identity manager component, respectively. The overall data sharing confidence score may be calculated by aggregating the confidence scores calculated by the components of the DM program 110A, 110B, 110C. It should be noted that invocation of one or more of the above components is optional and that the DM program 110A, 110B, 110C may not invoke one or more of its internal components (i.e., template manager, consent manager, trust manager, policy manager, & identity manager) based on the identified context of the interaction and the data sharing request. For example, the DM program 110A, 110B, 110C may not invoke the consent manager component when the data sharing request is not considered a new request. As such, calculation of the overall data sharing confidence score will not include a calculated confidence score from the consent manager component. As another example, in situations where the identified context of the interaction and the data sharing request strongly (e.g., above a threshold value) match a predefined template of the template manager component, the DM program 110A, 110B, 110C may not invoke one or more other internal components.

Next, at 206, the DM program 110A, 110B, 110C determines whether the overall data sharing confidence score, calculated at 204, is above (or meets) the threshold value defined by the user during the initialization/set-up of the DM program 110A, 110B, 110C. In response to determining that the overall data sharing confidence score is not above the threshold value defined by the user (step 206, "N" branch), the data sharing process 200 may proceed to step 208. In response to determining that the overall data sharing confidence score is above the threshold value defined by the user (step 206, "Y" branch), the data sharing process 200 may proceed to step 210.

At 208, in response to the overall data sharing confidence score being below the threshold value defined by the user, the DM program 110A, 110B, 110C prevents the IVA, operating on behalf of the user, from sharing the user data requested by the requesting entity. According to at least one embodiment, the DM program 110A, 110B, 110C may notify the user of the prevention of sharing, by the IVA, of user data in response to the data sharing request of the requesting entity. The notification may include details of the evaluation of the data sharing request performed at 204. For example, the notification to the user may include the calculated overall data sharing confidence score as well as the confidence scores calculated by the internal components of the DM program 110A, 110B, 110C.

At 210, in response to the overall data sharing confidence score being above the threshold value defined by the user, the DM program 110A, 110B, 110C instructs the IVA, operating on behalf of the user, to share the requested user data with the requesting entity. According to at least one embodiment, the DM program 110A, 110B, 110C may notify the user of the allowance of sharing, by the IVA, of user data in response to the data sharing request of the requesting entity. The notification may include details of the evaluation of the data sharing request performed at 204.

According to at least one further embodiment, the DM program 110A, 110B, 110C may create and maintain a knowledge corpus of previous interactions of the user, and one or more IVAs operating on behalf of the user, with one or more data requesting entities. Each interaction stored within the knowledge corpus may include information of a data request evaluation as described in steps 204-210. The knowledge corpus of previous interactions may be stored within one or more of data storage device 106 and database 116, and may be accessed by the DM program 110A, 110B, 110C.

The following scenarios are provided as examples of the operation of the DM program 110A, 110B, 110C, and its internal components, when evaluating a data request made during an interaction between a requesting entity and an IVA operating on behalf of a user:

Scenario 1 Background—An IVA is being used to represent a people manager in an organization and is interacting with an employee who reports to the people manager as a team lead. An IVA which represents a person in an organization may be used to respond to common queries and status updates, or it may attend a call which may be read only or only for responding to queries. In such situations, it is important that the IVA does not share any sensitive or confidential information of the organization or an employee. Assume that the DM program 110A, 110B, 110C is initialized with templates, of the template manager component, defining data sharing rules out of which one rule defines that people manager may share project related information with its employees. Further assume that a trust level with team lead is initialized to 4 on a scale of 0-5, the policy manager component is initialized with organization policies relating to data privacy, and a threshold value for sharing data is set to 7 on a scale of 0-10.

Scenario 1, Interaction A—Employee sends a message to an IVA representing the people manager requesting a new team structure that is going to be announced the next day. The DM program 110A, 110B, 110C monitoring the IVA conversation starts evaluation of the data request (i.e., the new team structure). The template manager component returns a confidence score of 8 since a predefined template defines that project related information can be shared with employees. The consent manager component is not called as it is invoked only when there is a new request which cannot be evaluated by the other components. The trust manager component returns a confidence score of 8 as trust with a team lead is set to 4. The policy manager component is invoked and returns a confidence score of 8. The identity manager component sends an authentication code to both parties (the people manager and the employee) and, after receiving confirmation, it returns a confidence score of 10 which confirms that the employee is not being impersonated. The DM program 110A, 110B, 110C aggregates the above confidence scores and calculates an overall data sharing confidence score of 8.5. Since the overall data sharing confidence score of 8.5 is greater than the threshold value for sharing data of 7, the requested data (i.e., the new team structure) is shared by the IVA representing the people manager with the employee.

Scenario 1, Interaction B—Employee sends a message to an IVA representing the people manager requesting salary information of another employee on the team. The DM program 110A, 110B, 110C monitoring the IVA conversation starts evaluation of the data request (i.e., the salary information of the other employee). The template manager component returns a confidence score of 3 since a predefined template defines that salary information of an employee cannot be shared with other employees. The consent manager component is not called as it is invoked only when there is a new request which cannot be evaluated by the other components. The trust manager component returns a confidence score of 8 as trust with a team lead is set to 4. The policy manager component is invoked and returns a confidence score of 2. The identity manager component sends an authentication code to both parties (the people manager and the employee) and after receiving confirmation it returns a confidence score of 10 which confirms that the employee is not being impersonated. The DM program 110A, 110B, 110C aggregates the above confidence scores and calculates an overall data sharing confidence score of 5.75. Since the overall data sharing confidence score of 5.75 is less than the threshold value for sharing data of 7, the requested data (i.e., the salary information of the other employee) is not shared by the IVA representing the people manager with the employee.

Scenario 2 Background—An IVA is being used to represent a person for a personal purpose. An IVA which represents a person may be used to respond on certain personal chats or make a call to perform tasks such as booking a table in a restaurant. In such situations, it is important that the IVA does not share any sensitive or confidential information of the person. Assume that the DM program 110A, 110B, 110C is initialized with templates, of the template manager component, defining data sharing rules out of which one rule defines that the IVA may share sensitive information of the user with family members. Further assume that a trust level with family members (e.g., child, spouse) is initialized to 5 on a scale of 0-5, the policy manager component is initialized with regional policies relating to data privacy, and a threshold value for sharing data is set to 6 on a scale of 0-10.

Scenario 2, Interaction A—Person's spouse performs an online purchase and uses person's credit card for payment. An OTP is sent to the person's mobile phone while the person is at work. The person's spouse sends a message to person asking for the OTP, however since the person is busy an IVA representing person starts to interact with the person's spouse. The DM program 110A, 110B, 110C monitoring the IVA conversation starts evaluation of the data request (i.e., the OTP). The template manager component returns a confidence score of 8 since a predefined template defines that sensitive information of the person may be shared with family members. The consent manager component is not called as it is invoked only when there is a new request which cannot be evaluated by the other components. The trust manager component returns a confidence score of 10 as trust with family members is set to 5. The policy manager component is invoked and returns a confidence score of 6 as per the regional policies relating to data privacy. The identity manager component sends an authentication code to both parties (the person and spouse) and after receiving confirmation it returns a confidence score of 10 which confirms that the spouse is not being impersonated. The DM program 110A, 110B, 110C aggregates the above confidence scores and calculates an overall data sharing confidence score of 8.5. Since the overall data sharing confidence score of 8.5 is greater than the threshold value for sharing data of 6, the requested data (i.e., the OTP) is shared by the IVA, operating on behalf of the person, with the person's spouse.

Scenario 2, Interaction B—Person instructs their IVA to make a call and reserve a table at a restaurant. An impersonating agent picks up the call and requests the IVA share an OTP which the agent claims is sent by the restaurant for booking confirmation. The DM program 110A, 110B, 110C monitoring the IVA conversation starts evaluation of the data request (i.e., the OTP). The template manager component returns a confidence score of 2 since a predefined template defines that sensitive information of the person may not be shared with anyone outside of family members. The consent manager component is invoked as this is a new request. When the person receives a message for consent, the person rejects the request, and the consent manager component returns a confidence score of 0. The trust manager component returns a confidence score of 0 as a trust level for this new agent is not defined in the DM program 110A, 110B, 110C. The policy manager component is invoked and returns a confidence score of 2 as per the regional policies relating to data privacy. The identity manager component sends an authentication code to both parties (the person and the agent) but does not receive a response from the agent and returns a confidence score of 0 which indicates potential impersonation. The DM program 110A, 110B, 110C aggregates the above confidence scores and calculates an overall data sharing confidence score of 0.8. Since the overall data sharing confidence score of 0.8 is less than the threshold value for sharing data of 6, the requested data (i.e., the OTP) is not shared by the IVA with the agent.

It may be appreciated that FIG. 2 provides only an illustration of one implementation and do not imply any limitations with regard to how different embodiments may be implemented. Many modifications to the depicted environments may be made based on design and implementation requirements.

Figure 3:
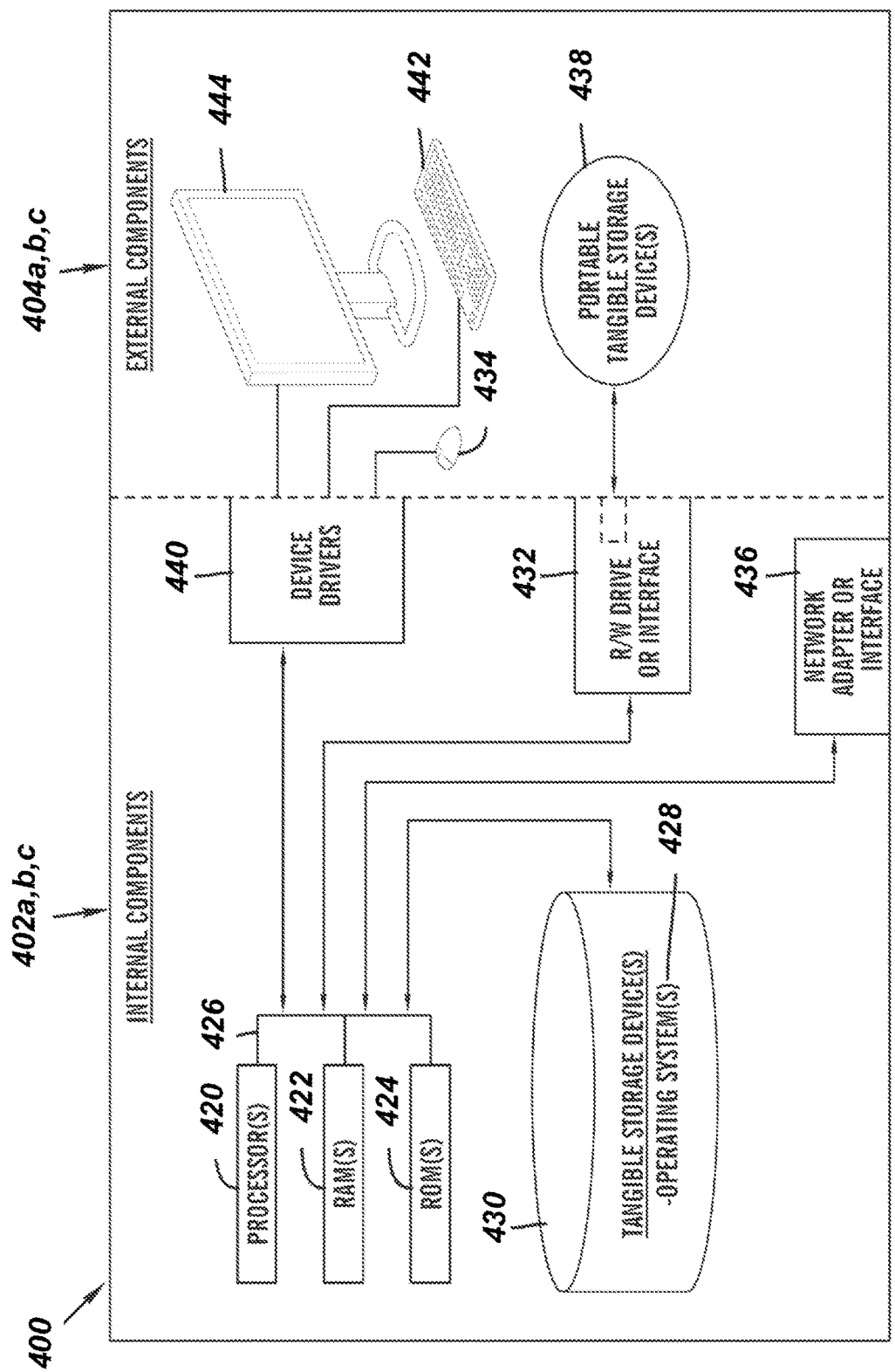
FIG. 3 is a functional block diagram of internal and external components of computers and servers depicted in FIG. 1 according to at least one embodiment.

FIG. 3 is a block diagram 400 of internal and external components of the client computing device 102, the IoT device 118, and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices, edge devices, and distributed cloud computing environments that include any of the above systems or devices.

The client computing device 102, the IoT device 118, and the server 112 may include respective sets of internal components 402 a,b,c and external components 404 a,b,c illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the DM program 110A in the client computing device 102, the DM program 110C in the IoT device 118, and the DM program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 *a,b,c* also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the DM program 110A, 110B, 110C can be stored on one or more of the respective portable computer-readable tangible storage devices 438, read via the respective RAY drive or interface 432, and loaded into the respective hard drive 430.

Each set of internal components 402 *a,b,c* also includes network adapters or interfaces 436 such as a TCP/IP adapter cards, wireless Wi-Fi interface cards, or 3G or 4G wireless interface cards or other wired or wireless communication links. The software program 108 and the DM program 110A in the client computing device 102, the DM program 110C in the IoT device 118, and the DM program 110C in the server 112 can be downloaded to the client computing device 102, the IoT device 118, and the server 112 from an external computer via a network (for example, the Internet, a local area network or other, wide area network) and respective network adapters or interfaces 436. From the network adapters or interfaces 436, the software program 108 and the DM program 110A in the client computing device 102, the DM program 110B in the IoT device 118, and the DM program 110C in the server 112 are loaded into the respective hard drive 430. The network may comprise copper wires, optical fibers, wireless transmission, routers, firewalls, switches, gateway computers and/or edge servers.

Each of the sets of external components 404 *a,b,c* can include a computer display monitor 444, a keyboard 442, and a computer mouse 434. External components 404 *a,b,c* can also include touch screens, virtual keyboards, touch pads, pointing devices, and other human interface devices. Each of the sets of internal components 402 *a,b,c* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
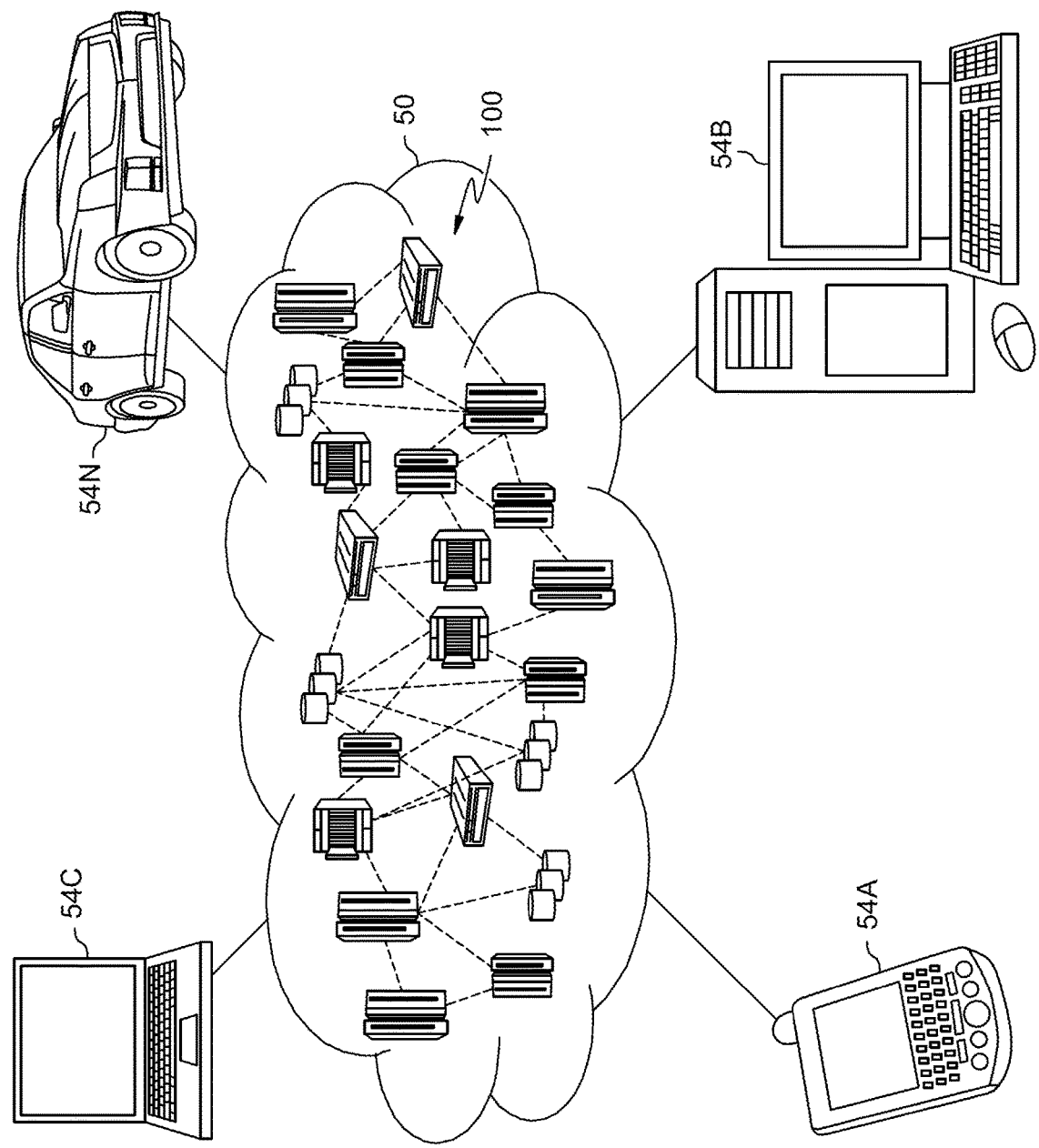
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
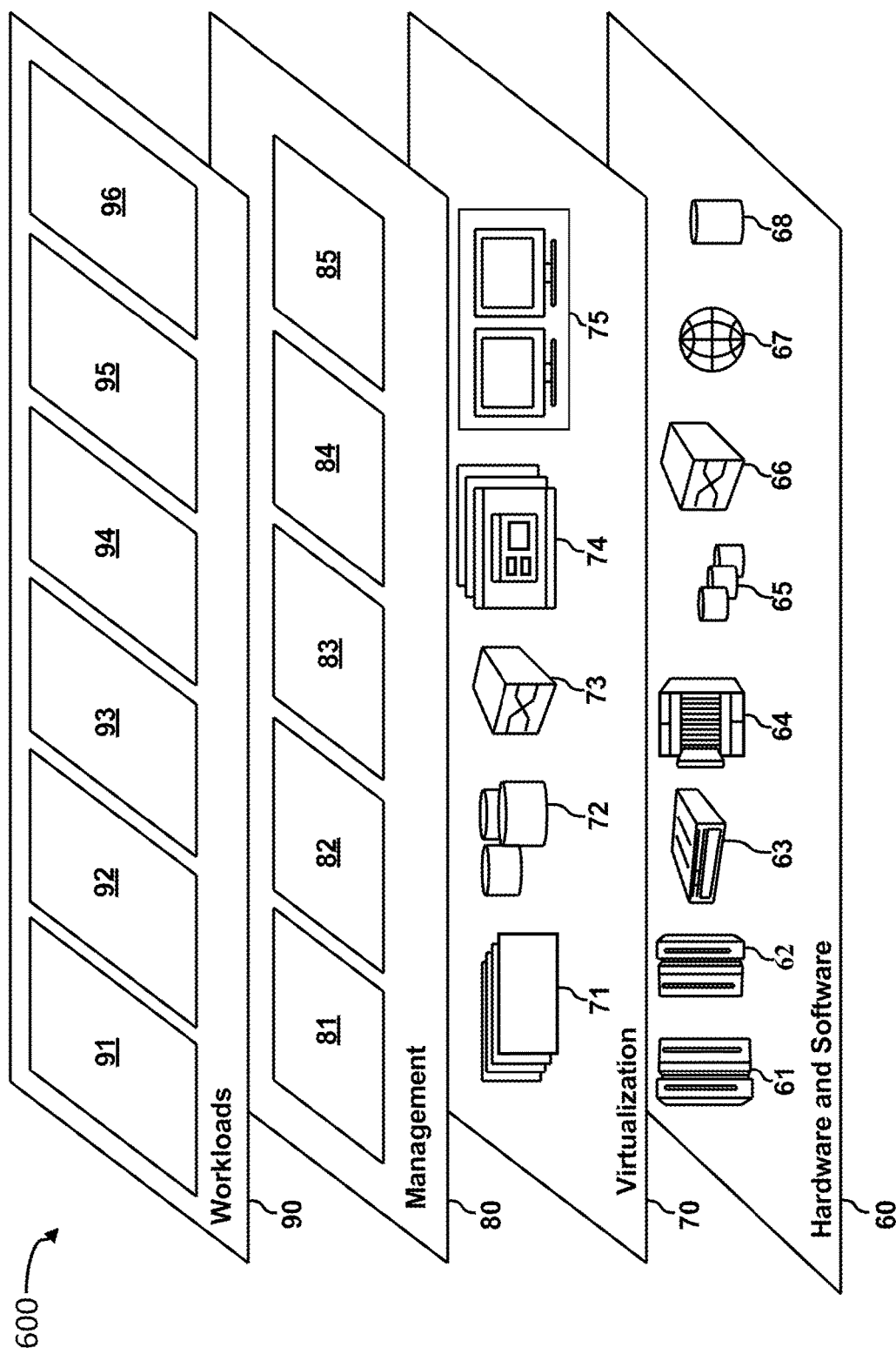
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data sharing management 96. Data sharing management 96 may relate to controlling what user data may be shared by an IVA of the user in response to a data request from a requesting entity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
receiving a request to share data of a user during an interaction between an intelligent virtual assistant (IVA) representing the user and a requesting entity, wherein the request is sent from the requesting entity to the IVA;
calculating an overall data sharing confidence score based on an evaluation of the request;
determining whether the overall data sharing confidence score is above a data sharing threshold value; and
in response to determining that the overall data sharing confidence score is above the data sharing threshold value, instructing the IVA to share the data of the user with the requesting entity.

2. The method of claim 1, further comprising:
in response to determining that the overall data sharing confidence score is below the data sharing threshold value, preventing the IVA from sharing the data of the user with the requesting entity.

3. The method of claim 1, wherein the evaluation of the request further comprises:
identifying a context of the interaction and the request to share data; and
evaluating the request via one or more of a template manager component, a consent manager component, a trust manager component, a policy manager component, and an identity manager component.

4. The method of claim 3, wherein identifying the context of the interaction and the request to share data comprises applying natural language processing (NLP) and sentiment analysis techniques to text of the interaction between the IVA and the requesting entity.

5. The method of claim 3, wherein evaluation via the template manager component comprises assessing the request to share data against one or more predefined templates which define one or more data sharing rules, and wherein evaluation via the consent manager component comprises receiving consent to share requested data from the user whom the IVA is representing, and wherein evaluation via the trust manager component comprises identifying a trust level for interaction between the IVA and the requesting entity, and wherein evaluation via the policy manager component comprises identifying organizational data sharing guidelines or regional data privacy policies which may be in effect for the user, and wherein evaluation via the identity manager component comprises authenticating identities of the user and the requesting entity; and wherein the template manager component, the consent manager component, the trust manager component, the policy manager component, and the identity manager component communicate among each other and accept inputs from each other.

6. The method of claim 3, wherein one or more predefined templates of the template manager component are updated based on one or more respective outputs of the consent manager component, the trust manager component, the policy manager component, and the identity manager component.

7. The method of claim 1, wherein the requesting entity comprises another IVA or a person, and wherein the interaction comprises a conversation via text or via voice.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is configured to performing a method comprising:
receiving a request to share data of a user during an interaction between an intelligent virtual assistant (IVA) representing the user and a requesting entity, wherein the request is sent from the requesting entity to the IVA;
calculating an overall data sharing confidence score based on an evaluation of the request;
determining whether the overall data sharing confidence score is above a data sharing threshold value; and
in response to determining that the overall data sharing confidence score is above the data sharing threshold value, instructing the IVA to share the data of the user with the requesting entity.

9. The computer system of claim 8, the method further comprising:
in response to determining that the overall data sharing confidence score is below the data sharing threshold value, preventing the IVA from sharing the data of the user with the requesting entity.

10. The computer system of claim 8, wherein the evaluation of the request further comprises:
identifying a context of the interaction and the request to share data; and
evaluating the request via one or more of a template manager component, a consent manager component, a trust manager component, a policy manager component, and an identity manager component.

11. The computer system of claim 10, wherein identifying the context of the interaction and the request to share data comprises applying natural language processing (NLP) and sentiment analysis techniques to text of the interaction between the IVA and the requesting entity.

12. The computer system of claim 10, wherein evaluation via the template manager component comprises assessing the request to share data against one or more predefined templates which define one or more data sharing rules, and wherein evaluation via the consent manager component comprises receiving consent to share requested data from the user whom the IVA is representing, and wherein evaluation via the trust manager component comprises identifying a trust level for interaction between the IVA and the requesting entity, and wherein evaluation via the policy manager component comprises identifying organizational data sharing guidelines or regional data privacy policies which may be in effect for the user, and wherein evaluation via the identity manager component comprises authenticating identities of the user and the requesting entity; and wherein the template manager component, the consent manager component, the trust manager component, the policy manager component, and the identity manager component communicate among each other and accept inputs from each other.

13. The computer system of claim 10, wherein one or more predefined templates of the template manager component are updated based on one or more respective outputs of the consent manager component, the trust manager component, the policy manager component, and the identity manager component.

14. The computer system of claim 8, wherein the requesting entity comprises another IVA or a person, and wherein the interaction comprises a conversation via text or via voice.

15. A computer program product, the computer program product comprising:
one or more computer-readable tangible storage medium and program instructions stored on at least one of the one or more tangible storage medium, the program instructions, when executed by a processor, cause the processor to perform a method, the method comprising:
receiving a request to share data of a user during an interaction between an intelligent virtual assistant (IVA) representing the user and a requesting entity, wherein the request is sent from the requesting entity to the IVA;
calculating an overall data sharing confidence score based on an evaluation of the request;
determining whether the overall data sharing confidence score is above a data sharing threshold value; and
in response to determining that the overall data sharing confidence score is above the data sharing threshold value, instructing the IVA to share the data of the user with the requesting entity.

16. The computer program product of claim 15, the method further comprising:
in response to determining that the overall data sharing confidence score is below the data sharing threshold value, preventing the IVA from sharing the data of the user with the requesting entity.

17. The computer program product of claim 15, wherein the evaluation of the request further comprises:
identifying a context of the interaction and the request to share data; and
evaluating the request via one or more of a template manager component, a consent manager component, a trust manager component, a policy manager component, and an identity manager component.

18. The computer program product of claim 17, wherein identifying the context of the interaction and the request to share data comprises applying natural language processing (NLP) and sentiment analysis techniques to text of the interaction between the IVA and the requesting entity.

19. The computer program product of claim 17, wherein evaluation via the template manager component comprises assessing the request to share data against one or more predefined templates which define one or more data sharing rules, and wherein evaluation via the consent manager component comprises receiving consent to share requested data from the user whom the IVA is representing, and wherein evaluation via the trust manager component comprises identifying a trust level for interaction between the IVA and the requesting entity, and wherein evaluation via the policy manager component comprises identifying organizational data sharing guidelines or regional data privacy policies which may be in effect for the user, and wherein evaluation via the identity manager component comprises authenticating identities of the user and the requesting entity; and wherein the template manager component, the consent manager component, the trust manager component, the policy manager component, and the identity manager component communicate among each other and accept inputs from each other.

20. The computer program product of claim 17, wherein one or more predefined templates of the template manager component are updated based on one or more respective outputs of the consent manager component, the trust manager component, the policy manager component, and the identity manager component.

* * * * *